United States Patent [19]

Yoshikawa

[11] Patent Number: 5,516,427
[45] Date of Patent: May 14, 1996

[54] SCREW TYPE DEWATERING MACHINE

[75] Inventor: Tadao Yoshikawa, Ibaraki, Japan

[73] Assignee: Hitachi Zosen Corporation, Japan

[21] Appl. No.: 426,062

[22] Filed: Apr. 21, 1995

Related U.S. Application Data

[62] Division of Ser. No. 251,620, May 31, 1994.

[30] Foreign Application Priority Data

Jun. 16, 1993 [JP] Japan ................................. 5-144126
Jun. 16, 1993 [JP] Japan ................................. 5-144127

[51] Int. Cl.$^6$ .......................... B01D 29/33; B01D 29/35; B01D 29/54; B01D 29/64
[52] U.S. Cl. ........................ 210/413; 210/415; 100/117
[58] Field of Search ..................... 210/413, 414, 210/415; 100/117

[56] References Cited

U.S. PATENT DOCUMENTS

| | | |
|---|---|---|
| 2,560,147 | 7/1951 | Anderson . |
| 3,199,441 | 8/1965 | Haug . |
| 3,230,865 | 1/1966 | Hibbel et al. . |
| 3,919,087 | 11/1975 | Brumagim . |
| 3,939,763 | 2/1976 | Sato . |
| 4,202,773 | 5/1980 | Fink et al. . |
| 4,361,081 | 11/1982 | Howard . |
| 4,412,485 | 11/1983 | Brown . |
| 4,470,904 | 9/1984 | Gail et al. . |
| 4,709,628 | 12/1987 | Glowacki . |
| 4,915,830 | 4/1990 | Mackay et al. . |
| 4,997,578 | 3/1991 | Berggren . |

FOREIGN PATENT DOCUMENTS

| | | |
|---|---|---|
| 0553783 | 8/1993 | European Pat. Off. . |
| 629427 | 6/1994 | European Pat. Off. . |
| 593115 | 8/1925 | France . |
| 647724 | 11/1928 | France . |
| 1241225 | 8/1960 | France . |
| 2341524 | 10/1977 | France . |
| 7246803 | 7/1994 | France . |
| 842161 | 6/1952 | Germany . |
| 1270533 | 6/1968 | Germany . |
| 1960060 | 11/1969 | Germany . |
| 2700542 | 9/1977 | Germany . |
| 231709 | 1/1986 | Germany . |
| 57-4398 | 1/1982 | Japan . |
| 59-191593 | 10/1984 | Japan . |
| 60-152395 | 8/1985 | Japan . |
| 60-255300 | 12/1985 | Japan . |
| 61-259897 | 11/1986 | Japan . |
| 62-89599 | 4/1987 | Japan . |
| 2-84299 | 3/1990 | Japan . |
| 3-95205 | 4/1991 | Japan . |
| 5-208300(A) | 8/1993 | Japan . |
| 6-695(A) | 1/1994 | Japan . |
| 6-79498 | 3/1994 | Japan . |
| 6-71491(A) | 3/1994 | Japan . |
| 1050877 | 10/1983 | U.S.S.R. . |
| 1252191 | 8/1986 | U.S.S.R. . |
| 1353469 | 11/1987 | U.S.S.R. . |
| 1491546 | 7/1989 | U.S.S.R. . |
| 1551561 | 3/1990 | U.S.S.R. . |
| 1558703 | 4/1990 | U.S.S.R. . |
| 1609708 | 11/1990 | U.S.S.R. . |
| 951520 | 3/1964 | United Kingdom . |
| 1127727 | 9/1968 | United Kingdom . |

*Primary Examiner*—Thomas M. Lithgow
*Attorney, Agent, or Firm*—D. Peter Hochberg; Mark Kusner; Michael Jaffe

[57] ABSTRACT

A screw type dewatering machine according to the present invention includes inner and outer sleeves (1, 2), an annular space chamber (3) defined therebetween, a coil-like screw (4) rotatably disposed in the annular space chamber (3), and drain screens (5, 12) disposed on the inner sleeve (1) and/or the outer sleeve (2), and is characterized in that a support ring (16) is attached to the outer periphery of one end of the coil-like screw (4) and is rotatably supported by the outer sleeve (2).

4 Claims, 8 Drawing Sheets

SCREW TYPE DEWATERING MACHINE

This is a divisional of co-pending application Ser. No. 08/251,620 filed on May 31, 1994 (pending).

FIELD OF THE INVENTION

This invention relates to a screw type dewatering machine for compressing and dewatering sludge, sewerage, night soil and the like.

BACKGROUND OF THE INVENTION

A known dewatering machine of this type comprises inner and outer sleeves disposed coaxial with each other, and a coil-like screw disposed in an annular space chamber defined between said inner and outer sleeves, said screw being rotatably supported at one end thereof by said inner and/or outer sleeves.

And a material to be dewatered is charged into said annular space chamber through a charge port disposed in one end of the outer sleeve and is compressed for dewatering by the rotation of said coil-like screw. The dewatered material is discharged through a discharge port formed in the end of the annular space chamber corresponding to the other end of said outer sleeve.

In this connection, according to the above arrangement, one end of the coil-like screw is only supported by the inner and/or outer sleeve, the other end not being supported by a special mechanism.

For this reason, the other end of the coil-like screw is elastically deformed under the reaction during compression, that is, the coil-like screw is contracted toward one end; therefore, there is a drawback that compression of material to be dewatered cannot be fully effected.

In addition, increasing the thickness of the coil-like screw would be effective to prevent elastic deformation but this is disadvantageous in that it leads to an increase in weight and to a need for increasing the strength of the dewatering machine, resulting in a large-sized apparatus with an increase in cost.

DISCLOSURE OF THE INVENTION

Accordingly, and object of the present invention is to provide a screw type dewatering machine adapted not to axially contract without having to increase the thickness of the coil-like screw.

To achieve this object, the invention provides a screw type dewatering machine including inner and outer sleeves disposed coaxial with each other, an annular space chamber defined between said inner and outer sleeves, a charge port for material to be dewatered formed in one end of said outer sleeve, a discharge port for said material formed in one end of said annular space chamber, and a coil-like screw rotatably disposed in said annular space chamber to convey toward said discharging port the material to be dewatered charged into said annular space chamber through said charging port, the other end of said annular space chamber being adapted to serve as a dewatering zone to compresses said material to squeeze the water therefrom, said water being discharged to the outside through a discharge screen installed on the inner and/or outer sleeve, the other end of said annular space chamber being adapted to serve as a plug zone to compress material to be dewatered, said screw type dewatering machine being characterized in that a support ring is attached to the outer peripheral surface of one end of said coil-like screw, said support ring being rotatably supported by the outer sleeve.

According to this arrangement, since one end of the coil is rotatably supported on the outer sleeve through the supported ring, there is no possibility of the other end being contracted under excessive reaction to compression, thus making it possible to effect more reliable compression of the material in the plug zone.

The thickness of the region of one end where the support ring is attached thereto is greater than that of the other end.

This arrangement prevents one end of the coil-like screw from being contracted under excessive reaction to compression, thus ensuring more reliable compression of the material in the plug zone.

Another screw type dewatering machine according to the present invention includes inner and outer sleeves disposed coaxial with each other, an annular space chamber defined between said inner and outer sleeves, a charge port for material to be dewatered formed in one end of said outer sleeve, a discharge port for said material formed in one end of said annular space chamber, and, a coil-like screw rotatably disposed in said annular space chamber to convey toward said discharging port the material to be dewatered charged into said annular space chamber through said charging port, one end of said annular space chamber being adapted to serve as a dewatering zone to compresses said material to squeeze the water therefrom, the water being discharged to the outside through a discharge screen installed on the inner and/or outer sleeve, the other end of said annular space chamber being adapted to serve as a plug zone to compress material to be dewatered, said screw type dewatering machine being characterized in that it further includes;

a rotary shaft body inserted in the inner sleeve through said discharge port, one end of said rotary shaft body being connected to one end of the coil-like screw, the other end of said rotary shaft body being supported by a support member, and a rotary driving device for rotating said rotary shaft body.

According to this arrangement, since one end of the coil-like screw is connected to the rotary shaft body coaxially inserted into the inner sleeve, said one end will never be contracted under the compression reaction toward the other end.

In this case also, compression of material to be dewatered can be reliably effected without having to increase the thickness of the coil-like screw.

Other numerous features and effects of the invention will become apparent from embodiments of the invention to be described below with reference to the accompanying drawings.

BRIEF DESCRIPTION OF THE DRAWINGS

FIG, 8 is a sectional view taken along the line B—B in FIG. 6.

DESCRIPTION OF THE PREFERRED EMBODIMENTS

A screw type dewatering machine according to a first embodiment of the invention will now be described with reference to the drawings.

Figure 1:
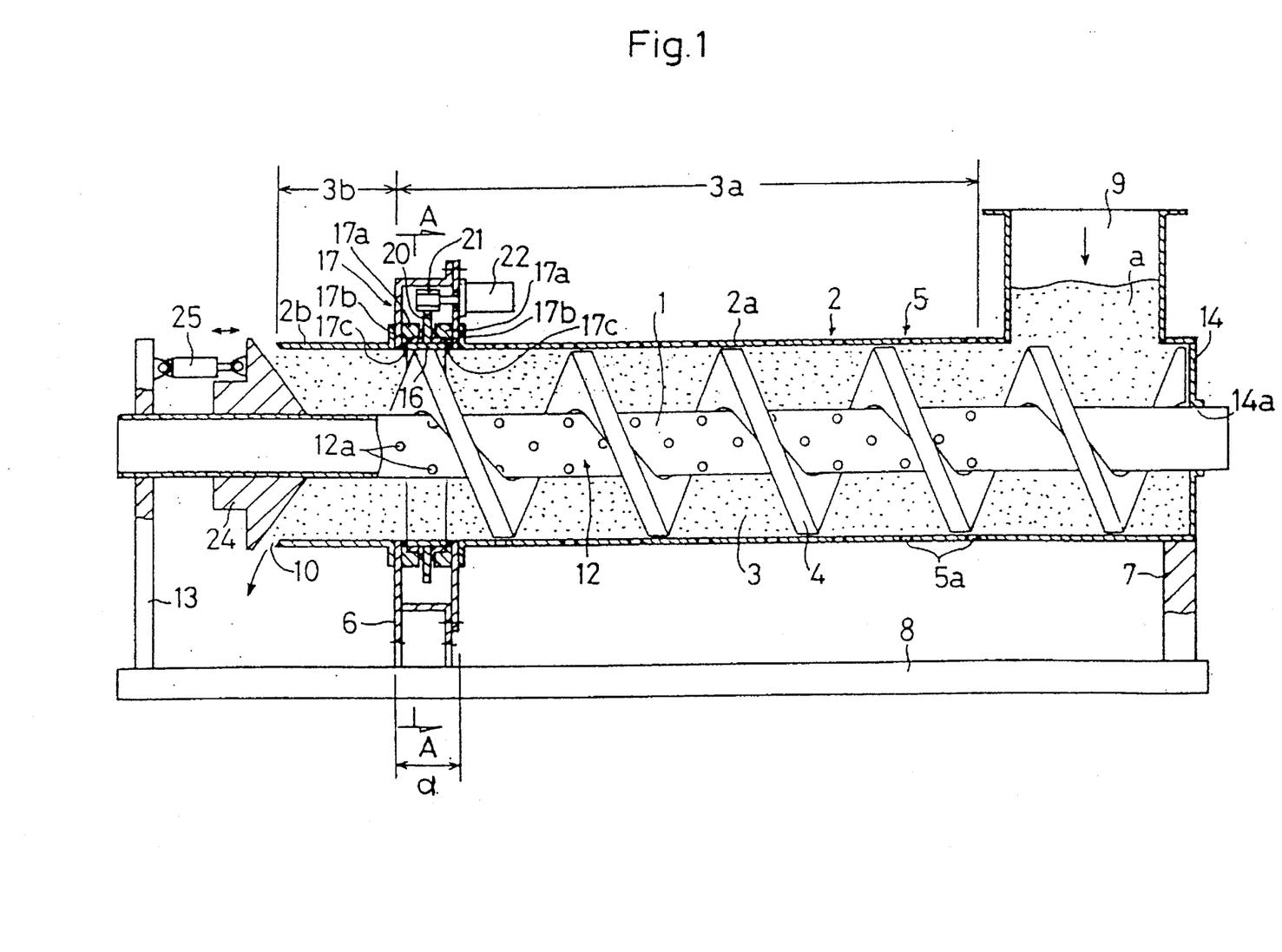
FIG. 1 is a sectional view of a screw type dewatering machine according to a first embodiment of the invention.
Figure 2:
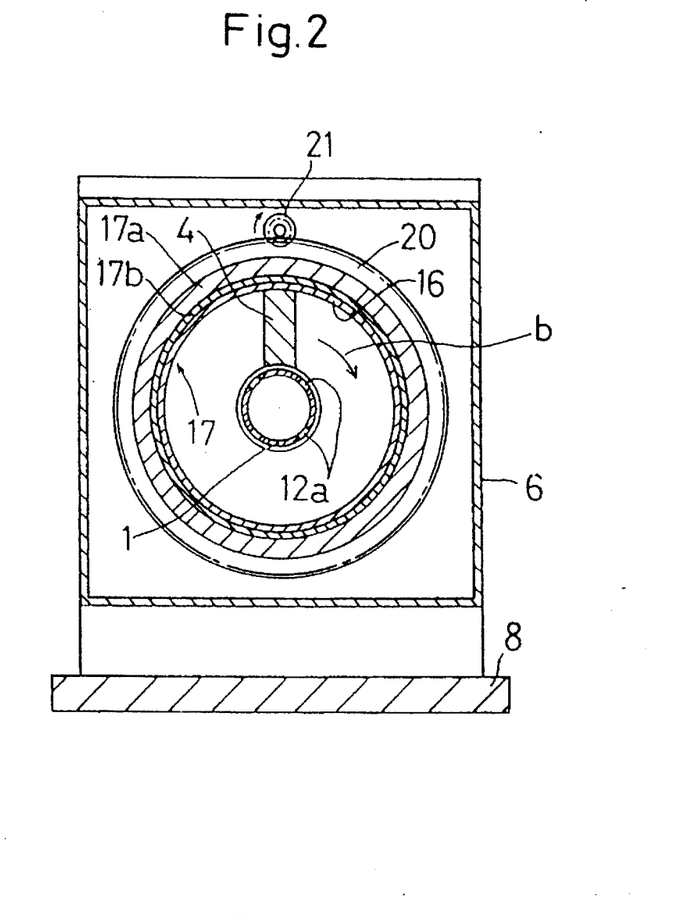
FIG. 2 is a sectional view taken along the line A—A in FIG. 1.

As shown in FIGS. 1 and 2, this screw type dewatering machine comprises an inner sleeve 1, an outer sleeve 2 disposed in said inner sleeve 1 coaxial with and outside said inner sleeve, and a coil-like screw 4 rotatably disposed in an annular space chamber 3 defined between said inner and outer sleeves 1 and 2.

The outer sleeve 2 comprises an outer sleeve body 2a having a drain screen 5 having a number of drain holes 5a, and an outer sleeve auxiliary 2b coaxially connected to one end of said outer sleeve body 2a with a predetermined clearance α therebetween through a support 6, said outer sleeve 2 being fixed to a rest 8 through the support 6 and a leg 7. Further, the other end of the outer sleeve body 2a is formed with a charge port 9 for a material to be dewatered a and the opening in the end of the outer sleeve auxiliary 2b provides a discharge port 10 for discharging to the outside the material a after the latter has been dewatered. In addition, a water collecting tank is installed under the outer sleeve 2.

The inner sleeve 1 has a drain screen 12 formed with a number of drain holes 12a. One end of the inner sleeve 2 is inserted in and supported by a through-hole 14a formed in the end plate 14 of the outer sleeve body 2a and the other end thereof projects outward through the discharge port 10 and is supported by a support plate 13 erected on the rest 8.

In this manner, the inner sleeve 1 is coaxially installed in the outer sleeve 2 to form a double tube construction.

The portion of the annular space chamber 3 which is closer to one end, i.e., which corresponds to the drain screens 5, 12 is adapted to serve as a dewatering zone 3a, while the portion of the annular space chamber 3 corresponding to the outer sleeve auxiliary 2b is adapted to serve as a plug zone 3b for compressing the material a into a compact form.

The coil-like screw 4 is chiefly installed in the dewatering zone 3a.

The outer peripheral surface of one end of this coil-like screw 4 has attached thereto a support ring 16 which has the same diameter as that of the outer sleeve 2, and the support ring 16 is held water tight by a screw support device 17 consisting of a bushing 17b and a sealing member 17c and in this state it is rotatably supported by the support 6.

Further, the outer peripheral surface of said support ring 16 has a ring rear 20 fixed thereon, and a motor 22 having a pinion 21 meshing with said ring gear 20 is attached to the support 6.

When this motor 22 is driven, the coil-like screw 4 is rotated in the direction indicated by an arrow b in FIG. 2; therefore, the material to be dewatered a fed into the annular space chamber 3 through the charge port 9 are conveyed to the discharge port 10.

The other end of said inner sleeve 1 has a cone valve 24 axially slidably fitted thereon, said cone valve 24 being movable toward the outer sleeve by a cylinder device 25.

The degree of opening of the discharge port 10 formed in the end of the annular space chamber 3 is adjusted by the movement of the cone valve 24.

The dewatering action will now be described.

The material to be dewatered a charged into the annular space chamber 3 through the charge port 9 is conveyed toward the discharge port 10 by the coil-like screw 4 via the dewatering zone 3a, where it is compressed for dewatering.

The water resulting from this dewatering action is discharged to the outside through the drain screens 5 and 12 formed on the inner and outer sleeves 1 and 2, respectively, while the dewatered material a is conveyed to the plug zone 3b, where it is further compressed by the cone valve 24 and coil-like screw 4 into a compact form and then discharged outside through the discharge port 10.

If the material a is compressed in the manner described above, the resulting excessive compression reaction acts on one end of the coil-like screw 4, but since said one end is rotatably supported by the support 6 (or the outer sleeve) through the support ring 16, there is no possibility of one end being elastically deformed by the compression reaction to contract toward the other end.

For this reason, reliable compression of the material a can be attained without having to increase the thickness of the coil-like screw 4.

Figure 3:
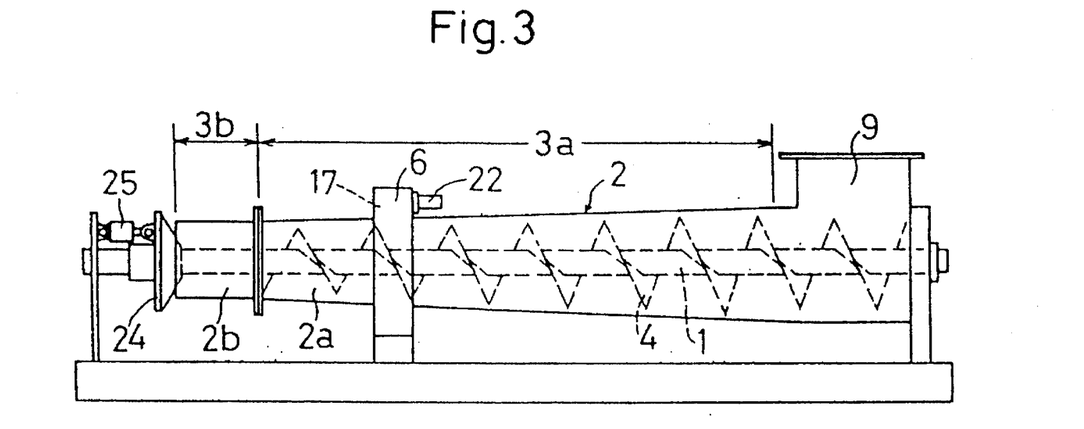
FIG. 3 is a side view of a screw type dewatering machine showing a modification of the first embodiment.

In the above embodiment, the support 6 having the screw support device 17 has been installed in contact with the plug zone 3b in the dewatering zone 3a equipped with the screw support device 17. However, as shown in FIG. 3, the support 6 may be installed in a position closer to the middle in the dewatering zone. Further, a straight tube whose opposite ends have the same diameter has been used as the outer sleeve 2. However, as shown in FIG. 3, use may be made of a taper tube which tapers from one end to the other. With this, it is possible to further increase the degree of compression of the material a.

Figure 4:
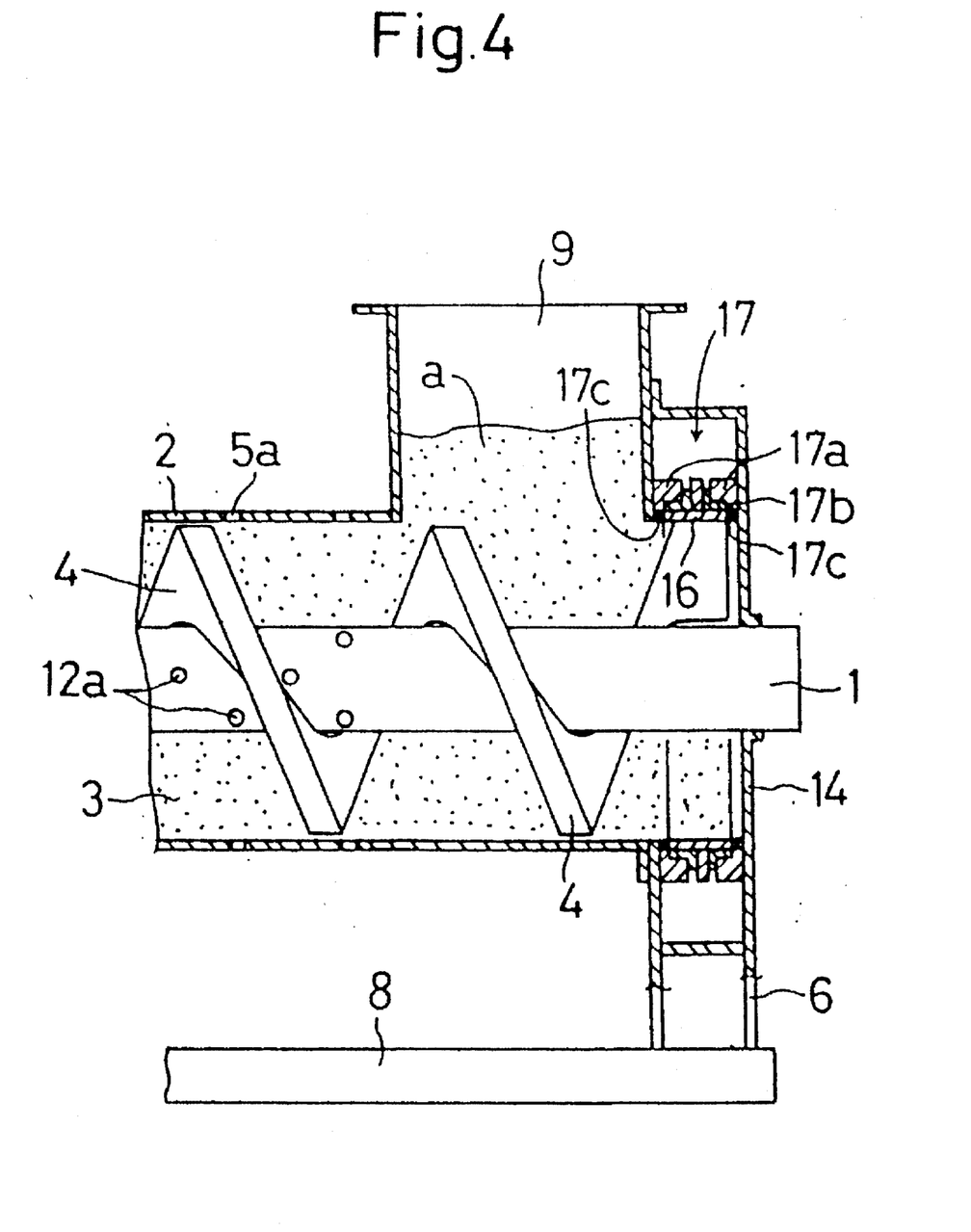
FIG. 4 is a principal sectional view of a screw type dewatering machine showing a modification of the first embodiment.

Further, as shown in FIG. 4, another screw support device 17 may also be installed at the other end of the coil-like screw 4. This makes it possible to drive the coil-like screw 4 for rotation more smoothly.

Figure 5:
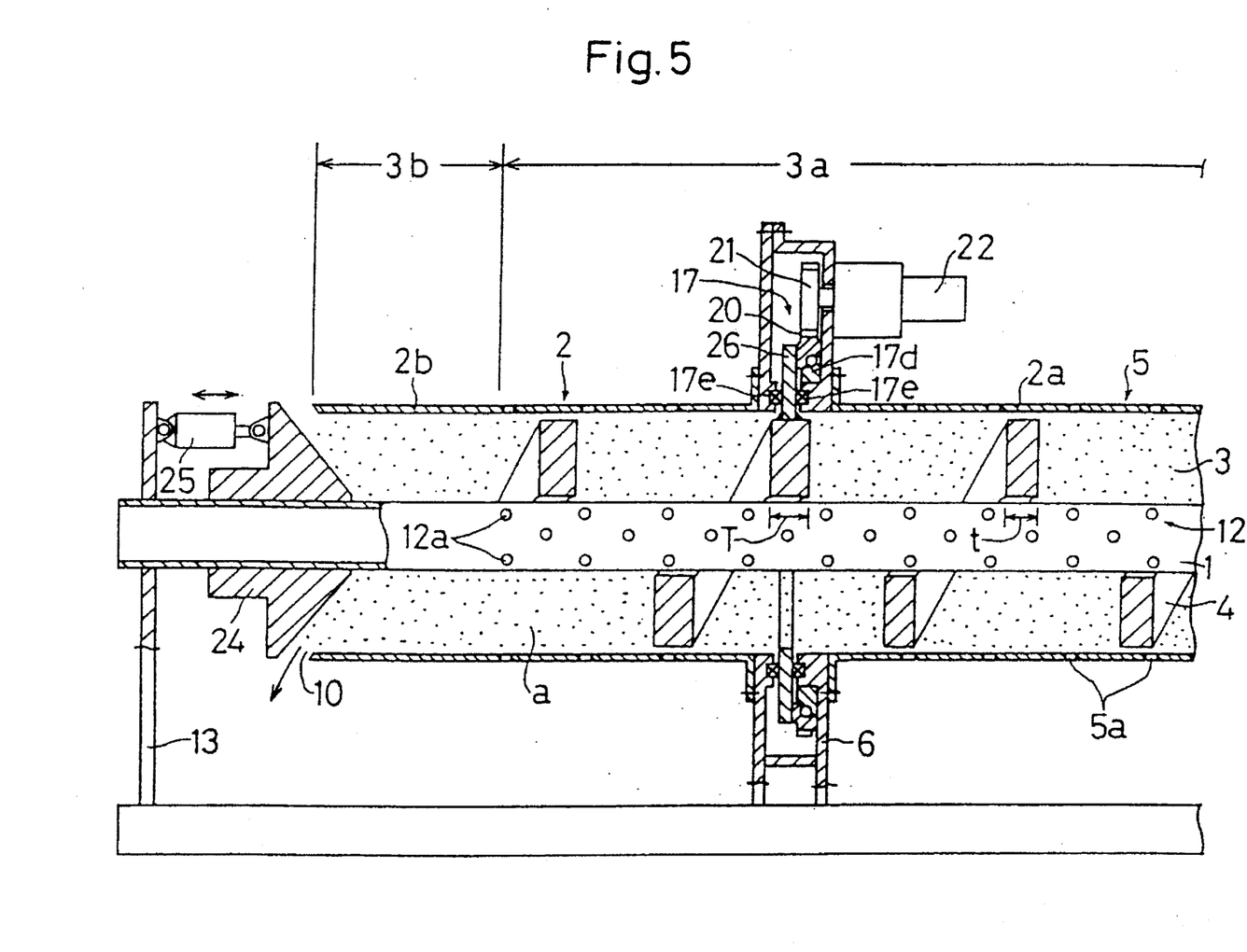
FIG. 5 is a principal sectional view of a screw type dewatering machine showing a modification of the first embodiment.

Further, as shown in FIG. 5, the wall thickness T of the region of the coil-like screw extending from its portion having the support ring attached thereto to the other end may be made greater than the wall thickness t of the other portion. This arrangement prevents one end of the coil-like screw 4 from being contracted under excessive reaction to compression, thus ensuring more reliable compression of the material a in the plug zone 3b. In addition, the screw support device 17 shown in FIG. 5 has a swingable bearing 17d supporting the support ring 26 by withstanding thrust and radial loads and bending moment, and a pair of sealing members 17e disposed in contact with opposite lateral surfaces of the support ring 26. A pinion 21 meshing with a ring gear 20 integrally formed on the outer periphery of the support ring 26 is driven for rotation, whereby the coil-like screw 4 is rotated.

In each of the embodiments described above, the ring gear 20 and pinion 21 may be replaced by a power transmission mechanism using a chain. Such power transmission mechanism may be installed on the other end of the coil-like screw 4 to drive the coil-like screw 4 from the end plate 14 of the outer sleeve 2.

And, it has been arranged that the inner and outer sleeves 1 and 2 are fixed while the coil-like screw 4 alone is driven for rotation; however, one or both of the inner and outer sleeves 1 and 2 may be driven for rotation separately from the coil-like screw 4. According to this arrangement, the shearing resistance of the material a is increased, so that dewatering by compression can be made more effective. Further, both inner and outer sleeves 1 and 2 have been formed with drain screens 5 and 12, respectively; however, only one of them may be formed with such drain screen.

Further, as shown in FIG. 5, the thickness of the coil-like screen has been varied (from T to t), but it may be varied in a plurality of steps. Further, the inner diameter of the coil-like screw 4 has been shown constant (a cylindrical surface), but the inner diameter of the coil-like screw 4 may be varied and the inner sleeve 1 may be tapered.

A screw type dewatering machine according to a second embodiment of the invention will now be described with reference to the drawings.

As shown in FIGS. 6 through 9, this screw type dewatering machine comprises an inner sleeve 31, an outer sleeve 32 disposed in said inner sleeve 31 coaxially with and outside said inner sleeve, a coil-like screw 34 rotatably disposed in an annular space chamber 33 defined between said inner and outer sleeves 31 and 32, and a screw driving device (rotary driving device) 36 for rotating said coil-like screw 34.

Figure 6:
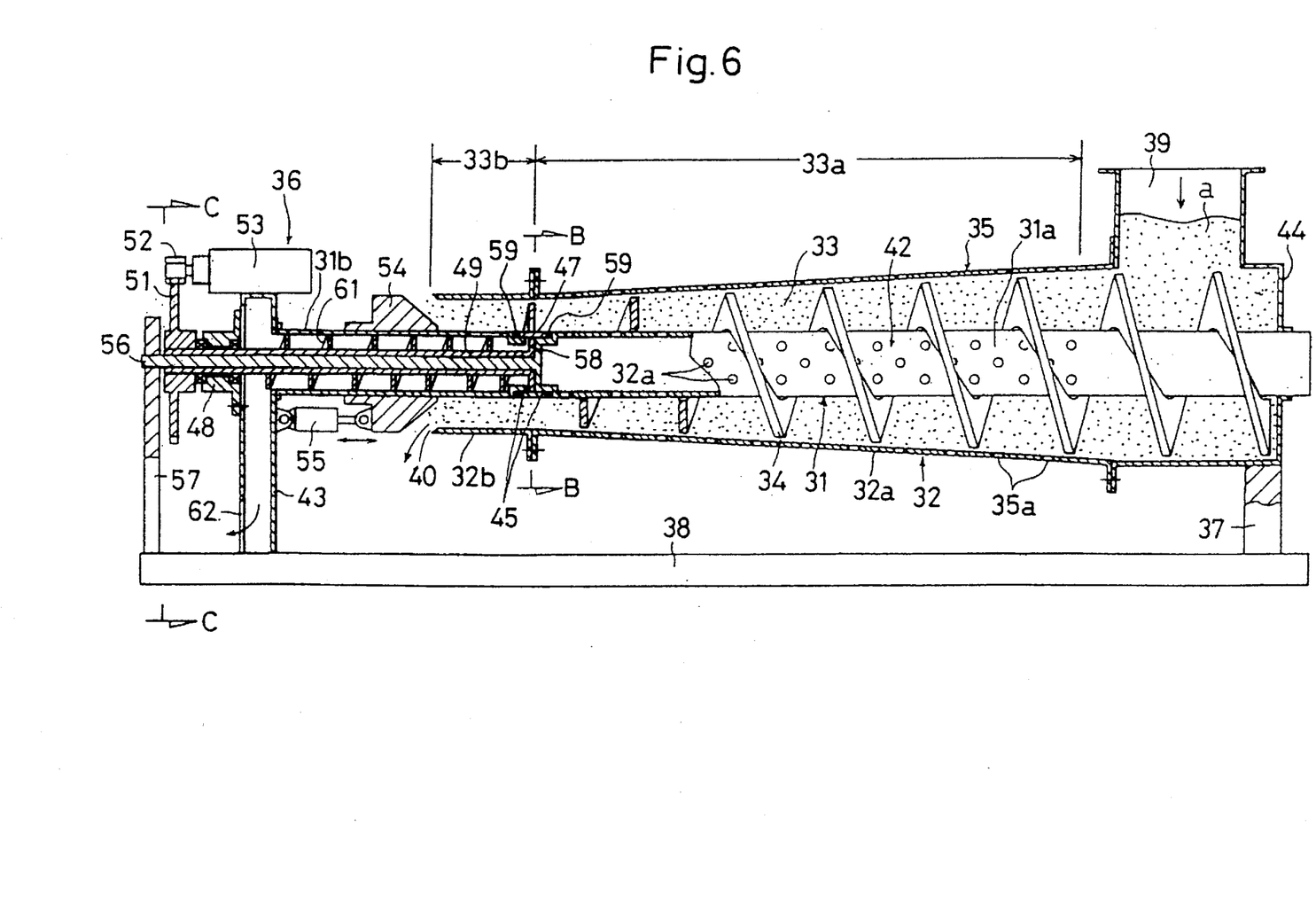
FIG. 6 is a sectional view of a screw type dewatering machine according to a second embodiment of the invention.

The outer sleeve 32 comprises an outer sleeve body 32a formed with a drain screen 35 having a number of drain holes 35a, and an outer sleeve auxiliary 32b coaxially connected to one end of said outer sleeve body 32a.

Further, the other end of the outer sleeve body 32a is supported on a rest 38 through a support plate 37 and is formed with a charge port 39 for a material to be dewatered a.

Further, one end of the outer sleeve auxiliary 32b is formed with a discharge port 40 for discharging to the outside the material a after the latter has been dewatered. In addition, a water collecting tank is installed under the outer sleeve 32.

The inner sleeve 31 comprises an inner sleeve body 31a consisting of a drain screen 42 formed a number of drain holes 42a, and an inner sleeve auxiliary 31b coaxially disposed at one end of said inner sleeve body 31a with some clearance therebetween One end of said inner sleeve auxiliary 31b is fixed to a rest 38 through a support 43 and the other end of said inner sleeve body 31a is inserted into a through-hole 44a formed in an end plate 44 at the other end of the outer sleeve body 32a.

As a result of this arrangement, the inner sleeve 31 is disposed coaxial with the outer sleeve 32. In addition, the inner sleeve auxiliary 31b is provided with a filter portion.

The region of the annular space chamber 33 corresponding to the drain screens 35 and 42 serves as a dewatering zone, while the region of the annular space chamber 33 corresponding to the outer sleeve auxiliary 32b serves as a plug zone for compressing the material to be dewatered a. And said dewatering zone 33a has the coil-like screw 34 disposed therein.

The screw driving device 36 for rotating the coil-like screw 34 will now be described.

Figure 7:
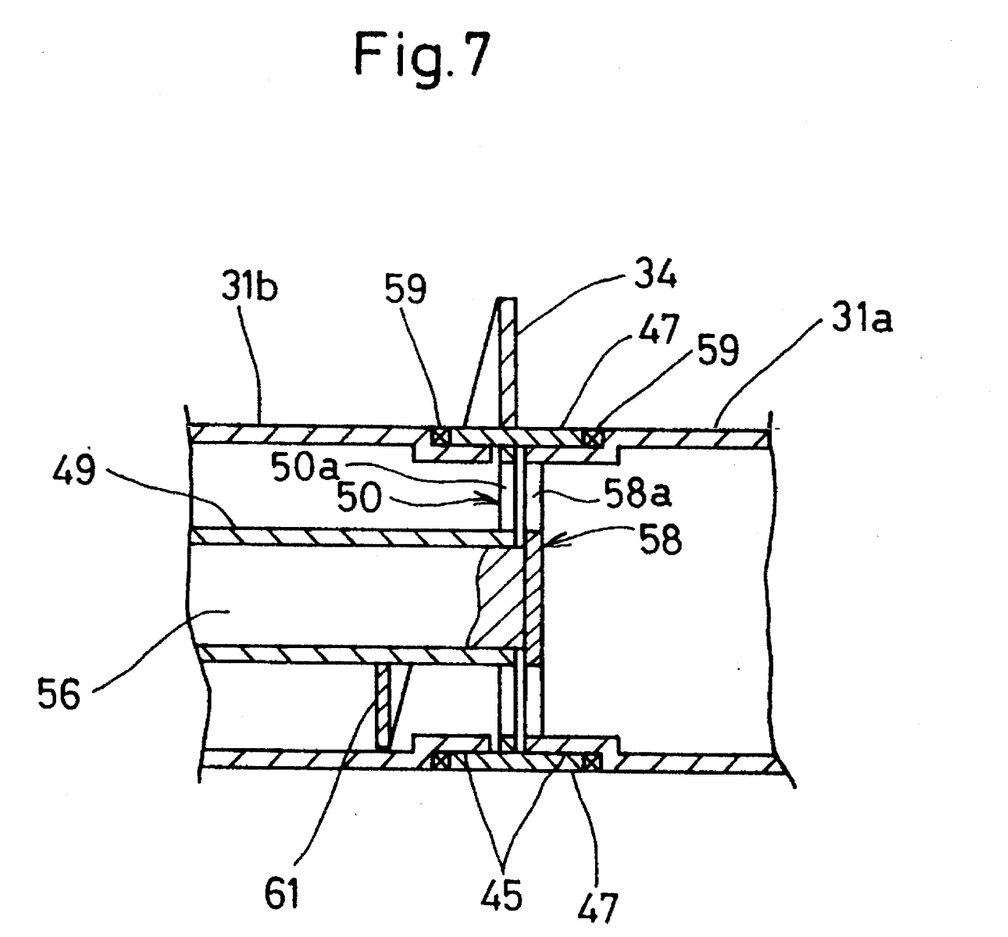
FIG. 7 is a principal enlarged sectional view of FIG. 6.

A rotary ring 47 of the same diameter as that of the inner sleeve 31 is rotatably disposed in an annular recess 45 formed in the function between the inner sleeve body 31a and inner sleeve auxiliary 31b, and one end of the coil-like screw 34 is connected to said rotary ring 47.

And a hollow rotary shaft 49 rotatably supported in a bearing 48 installed on the support 43 extends through the support 43 and is coaxially inserted into the inner sleeve auxiliary 31b. Further, said rotary ring 47 is connected to an end plate 50 disposed on one end of the rotary shaft 49.

The other end of said rotary shaft 49 has a gear 51 connected thereto, and a motor (driving device) 53 for rotating a pinion 52 meshing with said gear 51 is disposed on the support 43.

Figure 8:
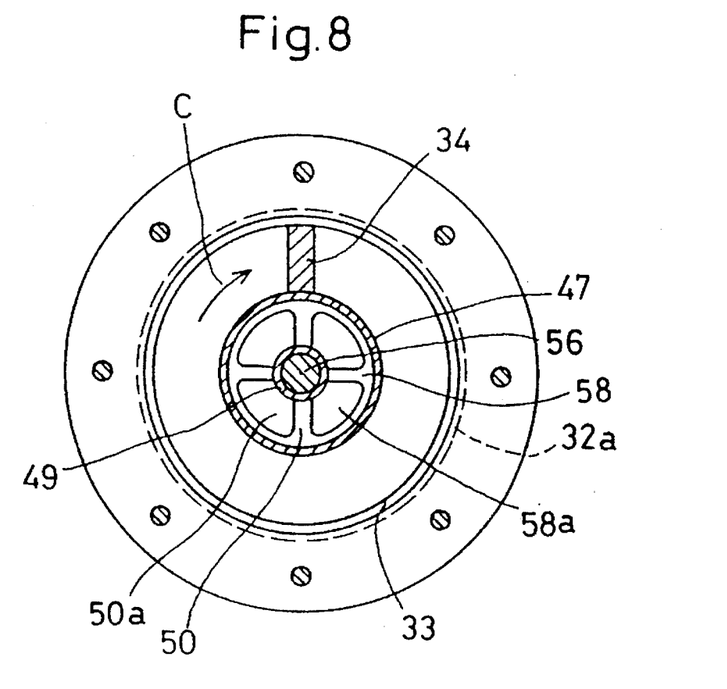
Figure 9:
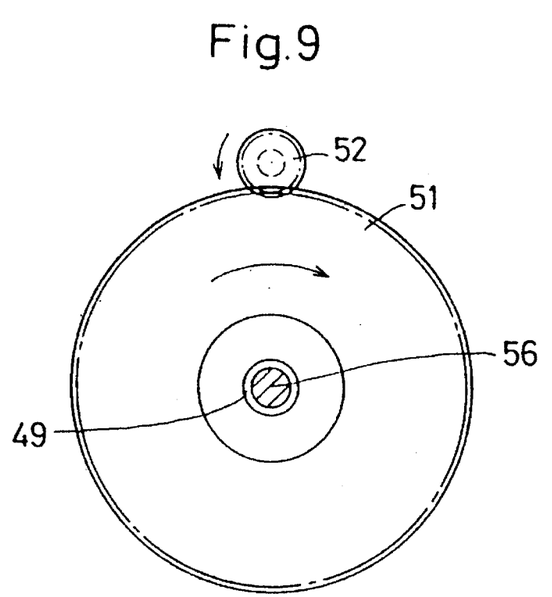
FIG. 9 is a sectional view taken along the line C—C in FIG.6.

When the motor 53 is rotated, the coil-like screw 34 is rotated in the direction of arrow c shown in FIG. 8 through the rotary shaft 49, end plate 50 and rotary ring 47; therefore, the material to be dewatered a fed into the annular space chamber 33 through the charge port 39 is conveyed toward the discharge port 40.

The inner sleeve auxiliary 31b has a cone valve 54 axially slidably fitted thereon, said cone valve 54 being moved forward and backward along the inner sleeve auxiliary 31b by a cylinder device 55.

The degree of opening of the discharge port 40 is adjusted by the movement of the cone valve 54.

Further, a support shaft (support member) 56 for supporting one end of the inner sleeve body 31a is inserted in the hollow of the rotary shaft body 49. That is, one end of the support shaft body 56 is connected to one end of the inner sleeve body 31a through an end plate 58 and the other end is supported by the rest 38 through a support plate 57. In addition, the numeral 59 in FIG. 6 is a sealing member.

Holes 50a and 58a are formed in the end plates 50 and 58 respectively so that water in the inner sleeve body 31a may be allowed to enter the inner sleeve anxiliary 31b.

Further, a cleaning screw 61 for draining water which has entered the inner sleeve auxiliary 31b is rotatably installed in the latter. This cleaning screw 61 is fixed on the outer periphery of the rotary shaft body 49.

When the rotary shaft body 49 is rotated, the water in the inner sleeve auxiliary 31b drops into the space in the support 31 and is discharged to the outside through a discharge port 62 formed in the support 43.

The dewatering action will now be described.

The material to be dewatered a charged into the annular space chamber 33 through the charge port 39 is conveyed toward the discharge port 40 by the coil-like screw 34 via the dewatering zone 33a, where it is compressed for dewatering.

The water resulting from this dewatering action is discharged to the outside through the drain screens 35 and 42 formed on the inner and outer sleeves 31 and 32, respectively.

The dewatered material a, on its way, is compressed in the plug zone 33b by the cone valve 54 and coil-like screw 34 into a compact form and then discharged to the outside through the discharge port 40.

If the material a is compressed in the manner described above, the resulting excessive compression reaction acts on one end of the coil-like screw 34, but since said one end is rotatably supported by the bearing 48 through the rotary shaft body 49, there is no possibility of one end of the coil-like screw 34 being elastically deformed by the compression reaction to contract toward the other end.

For this reason, reliable compression of the material a can be attained without having to increase the thickness of the coil-like screw 34.

A third embodiment of the present invention will now be described with reference to the drawings.

Figure 10:
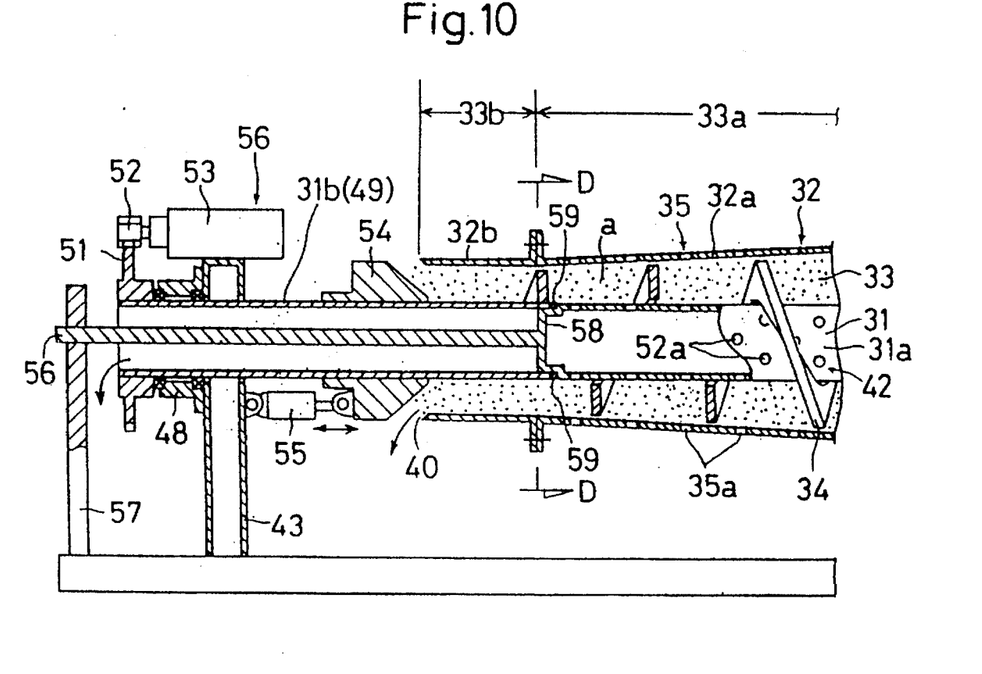
FIG. 10 is a sectional view of a screw type dewatering machine according to a third embodiment of the invention.

The third embodiment differs from the second embodiment in that the former is devoid of the cleaning screw, the rest of the arrangement being the same; therefore, the same parts are denoted by the same reference numerals and a description thereof is omitted.

Figure 11:
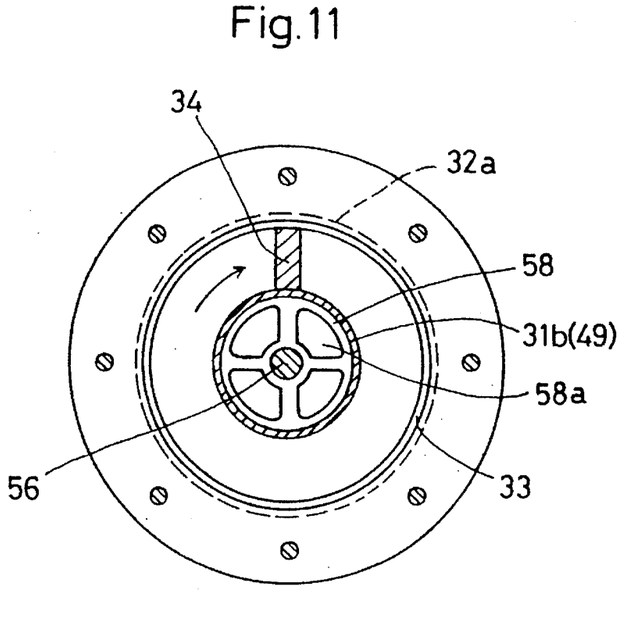
FIG. 11 is a sectional view taken along the line D—D in FIG. 10.

As shown in FIGS. 10 and 11, the screw dewatering machine is constructed such that the rotary shaft body 49 and the inner sleeve auxiliary 31b are integrated together. That is, the inner sleeve auxiliary 31b is rotatably supported through a bearing 48 on a support 43 and has a gear 51 attached to one end thereof, said gear 51 being driven by a motor 53 and a pinion 52.

And one end of the coil-like screw 34 is directly connected to the other end of said inner sleeve auxiliary 31b.

Therefore, when the motor 53 is driven, the coil-like screw 34 is rotated through the inner sleeve auxiliary 31b.

According to this embodiment, since the construction is simple, the manufacturing cost is low.

In the second and third embodiments, a taper tube has been used as the inner sleeve 32, but use may be made of a straight tube whose opposite ends have the same diameter. Further, the gear 51 and pinion 52 may be replaced by a power transmission mechanism having a chain. Further, the inner and inner sleeves 31 and 32 both have been formed with drain screens 35 and 42, respectively, but only one of them may be formed with such drain screen.

Thus, according to the second and third embodiments, since one end of the coil-like screw has been connected to the rotary shaft body which is coaxially inserted in the outer sleeve, there is no possibility of said one end being contracted toward the other end, so that reliable compression of the material to be dewatered can be effected without having to increase the thickness of the coil-like screw.

What is claimed is:

1. A screw type dewatering machine comprising:

a stationary elongated hollow inner sleeve defining an axis, said inner sleeve comprised of at least one inner sleeve segment;

an elongated outer sleeve coaxial with said inner sleeve, said outer comprised of at least one inner sleeve segment;

an annular space chamber defined between said coaxial inner and outer sleeve sleeves, said annular space chamber having a dewatering zone adjacent to a compaction zone;

a charge port formed at one end of said annular space chamber for receiving material to be dewatered, said charge port located adjacent to said dewatering zone;

a discharge port formed at the other end of said annular space chamber for discharging dewatered material, said discharge port located adjacent to said compaction zone;

a coil-like screw means rotatably disposed in said annular space chamber and extending past said charge port and through said dewatering zone to convey said material received at said charge port toward said discharge port, said coil-like screw means dewatering said material within said dewatering zone, and said coil-like screw means compressing said dewatered material within said compaction zone;

a screen disposed in said inner sleeve, the water dewatered in the dewatering zone being discharged through said screen;

a rotatable shaft means having first and second ends, and extending axially through said at least one inner sleeve segment, said first end of said shaft means being connected to said coil-like screw means via connecting means extending radially through the inner sleeve;

a first support means for supporting said second end of said shaft; and a rotary drive means for rotating said shaft means.

2. A screw-type dewatering machine as defined in claim 1, wherein said inner sleeve comprises coaxial inner sleeve segments meeting at a junction having an annular recess, and said connecting means further comprises:

a ring member connected to said coil-like screw means and arranged in said annular recess; and an annular plate member located at one end of said shaft means and disposed between said ring member and said shaft means.

3. A screw type dewatering machine as defined in claim 2, wherein said shaft means has a hollow center, and said machine further comprises an elongated support shaft body means extending through said hollow center of said shaft means, one end of said support shaft body connected to said annular plate member, and second support means for supporting the other end of said support shaft body.

4. A screw type dewatering machine as defined in claim 1, wherein said machine further comprises:

an inner screw means disposed between said shaft means and said at least one inner sleeve segment, for draining water entering said at least one inner sleeve segment.

* * * * *